(12) United States Patent
Haga et al.

(10) Patent No.: US 9,397,527 B2
(45) Date of Patent: Jul. 19, 2016

(54) STATOR UNIT AND MOTOR

(71) Applicant: Nidec Corporation, Kyoto (JP)

(72) Inventors: Hidehiro Haga, Kyoto (JP); Kuniaki Adachi, Kyoto (JP); Kensuke Shoji, Kyoto (JP); Takashi Hattori, Kyoto (JP); Takao Atarashi, Kyoto (JP); Masato Aono, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/481,994

(22) Filed: Sep. 10, 2014

(65) Prior Publication Data

US 2014/0375161 A1 Dec. 25, 2014

Related U.S. Application Data

(62) Division of application No. 13/493,237, filed on Jun. 11, 2012, now Pat. No. 9,209,658.

(30) Foreign Application Priority Data

Jun. 13, 2011 (JP) ................................. 2011-131605
Mar. 2, 2012 (JP) ................................. 2012-047366

(51) Int. Cl.
*H02K 3/28* (2006.01)
*H02K 3/18* (2006.01)
(Continued)

(52) U.S. Cl.
CPC .. *H02K 3/28* (2013.01); *H02K 1/27* (2013.01); *H02K 3/18* (2013.01); *H02K 3/345* (2013.01); *H02K 3/522* (2013.01); *H02K 2203/12* (2013.01); *H02K 2213/03* (2013.01)

(58) Field of Classification Search
CPC ..... H02K 3/522; H02K 1/27; H02K 2203/12; H02K 2213/03; H02K 3/18; H02K 3/28; H02K 3/345; H02K 3/34; H02K 3/32
USPC .................................................. 310/208, 215
See application file for complete search history.

(56) References Cited

U.S. PATENT DOCUMENTS

2005/0212644 A1* 9/2005 Yoshimori .................... 336/224
2008/0042512 A1 2/2008 Otsuji
(Continued)

FOREIGN PATENT DOCUMENTS

| JP | 2004-350450 A | 12/2004 |
|---|---|---|
| JP | 2005-229703 A | 8/2005 |

(Continued)

OTHER PUBLICATIONS

Haga et al., "Stator Unit and Motor", U.S. Appl. No. 13/493,237, filed Jun. 11, 2012.

*Primary Examiner* — Alex W Mok
(74) *Attorney, Agent, or Firm* — Keating & Bennett, LLP

(57) ABSTRACT

A stator unit including a coil in which a distance between an m−1-th turn and an m-th turn is wider than each distance in a first turn to the m−1-th turn. The m+1-th turn is disposed between the m−1-th turn and the m-th turn. Further, in a cross-section perpendicular to a central axis and passing a tooth, an angle between a line segment connecting respective centers of the m+1-th turn and the m−1-th turn and a line segment connecting respective centers of the m+1-th turn and the m-th turn is about 120° or more. With this structure, bulging in a circumferential direction of the coil adjacent to an inner peripheral portion of the tooth can be suppressed and a clearance can be secured between adjacent coils such that the number of turns of the coil can be increased.

15 Claims, 17 Drawing Sheets

(51) Int. Cl.
*H02K 1/27* (2006.01)
*H02K 3/52* (2006.01)
*H02K 3/34* (2006.01)

(56) References Cited

U.S. PATENT DOCUMENTS

| | | | |
|---|---|---|---|
| 2009/0085422 A1 | 4/2009 | Kusawake et al. | |
| 2011/0156523 A1 | 6/2011 | Kljaic et al. | |

FOREIGN PATENT DOCUMENTS

| | | | | |
|---|---|---|---|---|
| JP | 2006115565 A | * | 4/2006 | |
| JP | 2006320167 A | * | 11/2006 | |
| JP | 2007-135360 A | | 5/2007 | |
| JP | 2007135326 A | * | 5/2007 | |
| JP | 2007-267492 A | | 10/2007 | |
| JP | 2007-288983 A | | 11/2007 | |
| JP | 2008043108 A | * | 2/2008 | |
| JP | 2008278628 A | * | 11/2008 | |
| JP | 2010136597 A | * | 6/2010 | |
| JP | 2011239535 A | * | 11/2011 | |
| JP | 2011259614 A | * | 12/2011 | |
| JP | 2012095484 A | * | 5/2012 | |

* cited by examiner

STATOR UNIT AND MOTOR

BACKGROUND OF THE INVENTION

1. Field of the Invention

The present invention relates to a stator unit and more specifically to a motor including a stator unit.

2. Description of the Related Art

In a conventional motor, a structure in which an insulator made of resin is mounted on a plurality of teeth extending radially with respect to a central axis and a conducting wire is wound around the insulator, thereby forming a coil is known. The insulator is interposed between the tooth and the coil, thereby electrically insulating both members from each other. A conventional motor having such an insulator is described in, for example, Japanese Unexamined Patent Application Publication No. 2007-267492.

When designing a motor, there is a desire to increase the number of turns of a coil in order to enhance characteristics such as torque. However, as the number of turns of a coil is increased, it becomes more and more difficult to secure a clearance between coils that are adjacent to each other in a circumferential direction. In particular, in a motor having an insulator, an amount of bulging of the coils becomes very large. For this reason contact between adjacent coils will easily occur in the vicinity of an inner peripheral portion of the coil.

SUMMARY OF THE INVENTION

Preferred embodiments of the present invention provide a technique of allowing a clearance to be secured between adjacent coils while also increasing the number of turns of a coil in a motor having an insulator.

According to a first preferred embodiment of the present invention, a stator unit includes a plurality of teeth extending in a radial direction with respect to a central axis; an insulator which covers each of the plurality of teeth; and a coil which is defined by a conducting wire wound around the insulator, wherein when m is set to be an integer of 2 or more and n is set to be an integer larger than m+1, the coil includes a first layer defined by a first turn to an m-th turn, and a second layer defined by an m+1-th turn to an n-th turn, the first turn to the m-th turn are sequentially wound around the insulator toward the inside in the radial direction from the outside in the radial direction, the m+1-th turn to the n-th turn are sequentially wound toward the outside in the radial direction from the inside in the radial direction, the distance between the m−1-th turn and the m-th turn is wider than each distance in the first turn to the m−1-th turn, the insulator includes a wall portion protruding in a direction away from the tooth between the m−1-th turn and the m-th turn, and the m+1-th turn is in contact with the wall portion.

According to a second preferred embodiment of the present invention, a stator unit includes a plurality of teeth extending in a radial direction with respect to a central axis; an insulator which covers each of the plurality of teeth; and a coil which is defined by a conducting wire wound around the insulator, wherein when m is set to be an integer of 2 or more and n is set to be an integer larger than m+1, the coil includes a first layer defined by a first turn to an m-th turn, and a second layer defined by an m+1-th turn to an n-th turn, the first turn to the m-th turn are sequentially wound around the insulator toward the inside in the radial direction from the outside in the radial direction, the m+1-th turn to the n-th turn are sequentially wound toward the outside in the radial direction from the inside in the radial direction, the distance between the m−1-th turn and the m-th turn is wider than each distance in the first turn to the m−1-th turn, the m+1-th turn is disposed between the m−1-th turn and the m-th turn, and in a cross-section perpendicular or substantially perpendicular to the central axis and passing through the tooth, an angle between a line segment connecting the respective centers of the m+1-th turn and the m−1-th turn and a line segment connecting the respective centers of the m+1-th turn and the m-th turn is about 120° or more.

According to the first and second preferred embodiments of the present invention, in the vicinity of an inner peripheral portion of the tooth, bulging of the coil in a circumferential direction surrounding the central axis can be suppressed. For this reason, a clearance can be secured between adjacent coils, and as a result of this, the number of turns of the coil can be increased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, exemplary preferred embodiments of the present invention will be described with reference to the drawings.

Figure 1:
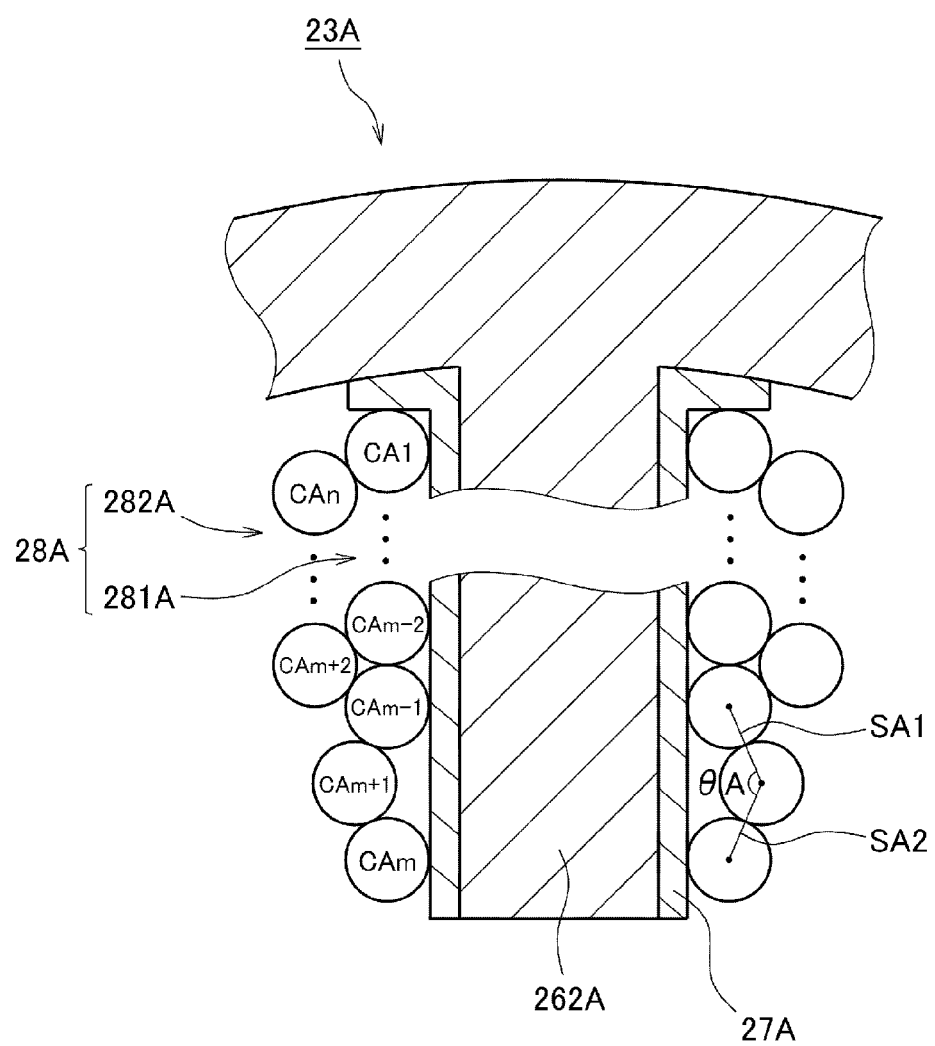
FIG. 1 is a partial cross-sectional view of a stator unit in accordance with a preferred embodiment of the present invention.

FIG. 1 is a partial cross-sectional view of a stator unit 23A related to a first preferred embodiment of the present invention. The stator unit 23A is provided with a plurality of teeth 262A each extending in a radial direction with respect to the central axis. In FIG. 1, the cross-sections perpendicular to the central axis of one of the teeth 262A and portions in the vicinity thereof are shown. Each of teeth 262A is covered by an insulator 27A. Further, a conducting wire is wound around the insulator 27A, so that a coil 28A is provided.

Here, m is set to be an integer of 2 or more and n is set to be an integer larger than m+1. As shown in FIG. 1, the coil 28A includes a first layer 281A defined by a first turn CA1 to an m-th turn CAm, and a second layer 282A defined by an m+1-th turn CAm+1 to an n-th turn CAn. The first turn CA1 to the m-th turn CAm are sequentially wound around the insulator 27A toward the inside in the radial direction from the outside in the radial direction. The m+1-th turn CAm+1 to the n-th turn CAn are sequentially wound toward the outside in the radial direction from the inside in the radial direction.

The distance between the m−1-th turn CAm−1 and the m-th turn CAm is preferably wider than each distance in the first turn CA1 to the m−1-th turn CAm−1. Then, the m+1-th turn CAm+1 is disposed between the m−1-th turn CAm−1 and the m-th turn CAm.

Further, as shown in FIG. 1, in this preferred embodiment, in a cross-section perpendicular to the central axis and passing through one of the teeth 262A, an angle θA between a line segment SA1 connecting the respective centers of the m+1-th turn CAm+1 and the m−1-th turn CAm−1 and a line segment SA2 connecting the respective centers of the m+1-th turn CAm+1 and the m-th turn CAm preferably is set to be about 120° or more. That is, the m+1-th turn CAm+1 is disposed at a position closer to one of the teeth 262A, compared to a case where the angle θA is less than about 120°. In this way, in the vicinity of an inner peripheral portion of one of the teeth 262A, bulging of the coil 28A in a circumferential direction surrounding the central axis is suppressed. In this way, a clearance can be secured between adjacent coils 28A, and as a result, the number of turns of the coil 28A can be increased. Further, in that case, the m+1-th turn CAm+1 may be in contact with the insulator or not in contact with the insulator.

Figure 2:
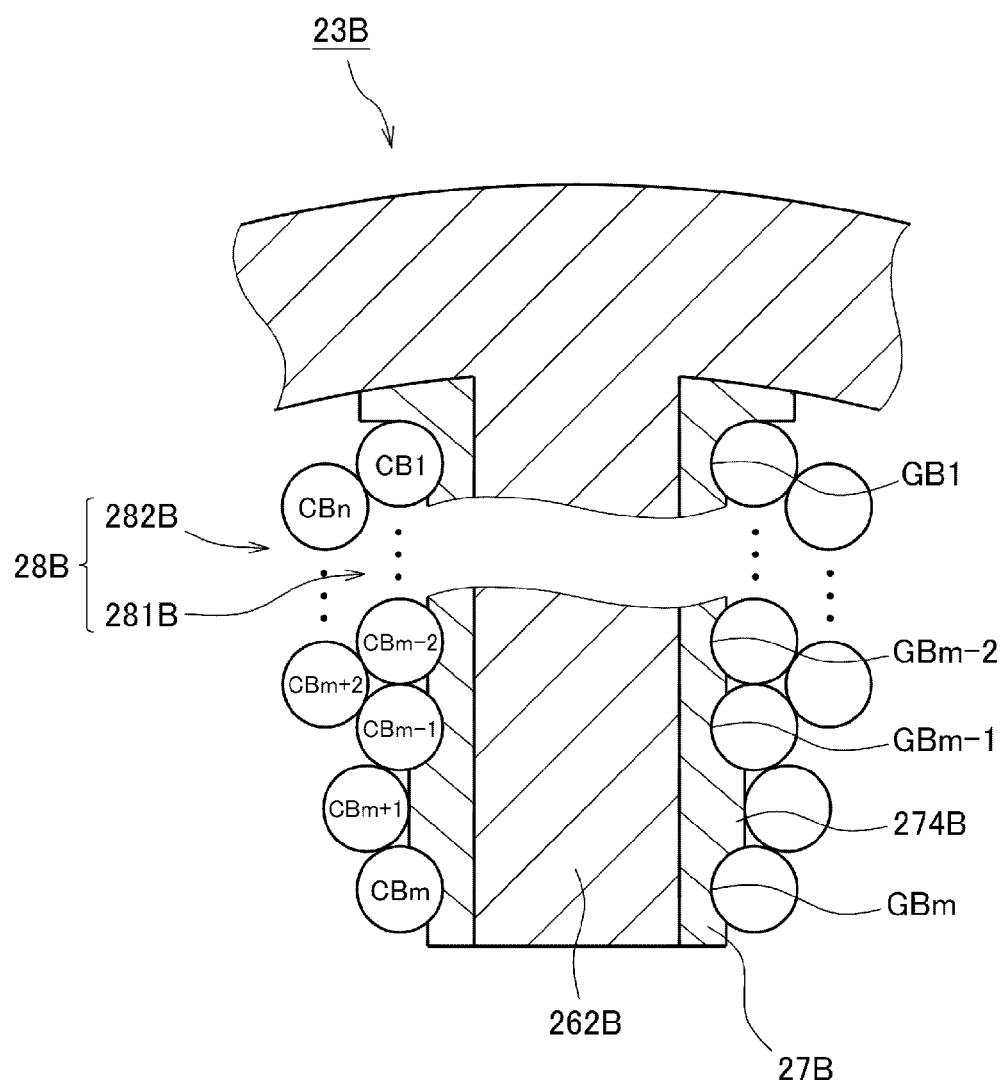
FIG. 2 is a partial cross-sectional view of the stator unit in accordance with a preferred embodiment of the present invention.

FIG. 2 is a partial cross-sectional view of a stator unit 23B related to a second preferred embodiment of the present invention. The stator unit 23B is preferably provided with a plurality of teeth 262B each extending in the radial direction with respect to the central axis. In FIG. 2, the cross-sections perpendicular to the central axis of one tooth 262B and portions in the vicinity thereof are shown. Each tooth 262B is covered by an insulator 27B. Further, a conducting wire is wound around the insulator 27B, so that a coil 28B is provided.

Here, m is set to be an integer of 2 or more and n is set to be an integer larger than m+1. As shown in FIG. 2, the coil 28B includes a first layer 281B defined by the first turn CB1 to the m-th turn CBm, and a second layer 282B defined by the m+1-th turn CBm+1 to the n-th turn CBn. The first turn CB1 to the m-th turn CBm are sequentially wound around the insulator 27B toward the inside in the radial direction from the outside in the radial direction. The m+1-th turn CBm+1 to the n-th turn CBn are sequentially wound toward the outside in the radial direction from the inside in the radial direction.

The distance between the m−1-th turn CBm−1 and the m-th turn CBm is preferably wider than each distance in the first turn CB1 to the m−1-th turn CBm−1. Further, as shown in FIG. 2, the insulator 27B in this preferred embodiment preferably includes a first groove GB1 to an m-th groove GBm, and a wall portion 274B. The first turn CB1 to the m-th turn CBm of the coil 28B respectively extend along the first groove GB1 to the m-th groove GBm. The wall portion 274B is located between the m−1-th groove GBm−1 and the m-th groove GBm, that is, between the m−1-th turn CBm−1 and the m-th turn CBm. The wall portion 274B protrudes in a direction away from the tooth 262B with the most recessed bottom portion of each of the m−1-th groove GBm−1 and the m-th groove GBm as the standard. In other words, the insulator includes the first groove GB1 to the m-th groove GBm each extending along each of the first turn CB1 to the m-th turn CBm of the coil.

The m+1-th turn CBm+1 of the coil 28B is in contact with the wall portion 274B. In this way, the m+1-th turn CBm+1 is stably disposed along the wall portion 274B. Further, the m+1-th turn CBm+1 is disposed at a position closer to the tooth 262B than in a case where the m+1-th turn CBm+1 is spaced apart from the insulator 27B. In this way, in the vicinity of an inner peripheral portion of the tooth 262B, bulging of the coil 28B in a circumferential direction surrounding the central axis is suppressed. In this way, a clearance can be secured between adjacent coils 28B, and as a result, the number of turns of the coil 28B can be increased.

Subsequently, a third preferred embodiment of the present invention will be described. In addition, in the following, the shape or the positional relationship of each section will be described with a direction along a central axis 9 of a motor 1 as an up-and-down (i.e., an axial) direction. However, this is only to define the up-and-down direction for convenience of explanation and is not to limit the directions in use of the stator unit and the motor according to the preferred embodiments of the present invention.

The motor 1 in this preferred embodiment is preferably mounted on, for example, an automobile and arranged to generate the driving force of a power steering. However, the motor according to a preferred embodiment of the present invention may also be used in other known applications. For example, the motor according to preferred embodiments of the present invention may also be used as a drive source of another site of an automobile, for example, a fan arranged to provide engine cooling. Further, the motor according to a preferred embodiment of the present invention may also be mounted on home electric appliances, office automation equipment, medical equipment, or the like, thereby generating various driving forces.

Figure 3:
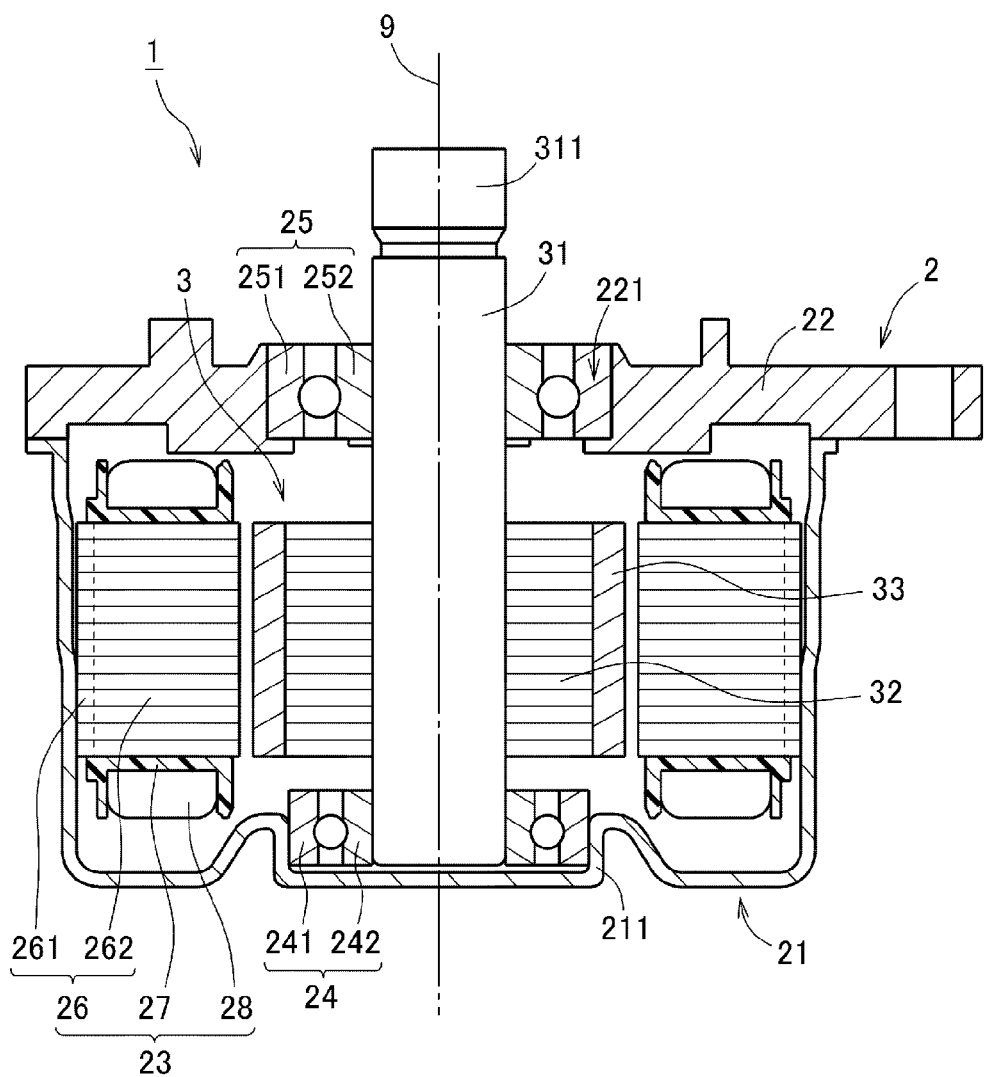
FIG. 3 is a vertical cross-sectional view of a motor in accordance with a preferred embodiment of the present invention.

FIG. 3 is a vertical cross-sectional view of the motor 1 related to the third preferred embodiment. As shown in FIG. 3, the motor 1 includes a stationary section 2 and a rotating section 3. The stationary section 2 is preferably fixed to a frame body of an apparatus that becomes a driving target. The rotating section 3 is supported so as to be able to rotate with respect to the stationary section 2.

The stationary section 2 in this preferred embodiment preferably includes a housing 21, a cover section 22, a stator unit 23, a lower bearing section 24, and an upper bearing section 25.

The housing 21 is preferably a substantially cylindrical casing. The cover section 22 is preferably a plate-shaped member which closes off an opening of an upper portion of the housing 21. The stator unit 23, the lower bearing section 24, a rotor core 32 (described later), and a plurality of magnets 33 (described later) are accommodated in an inner space surrounded by the housing 21 and the cover section 22. A concave portion 211 arranged to retain the lower bearing section 24 is provided at the center of the lower surface of the housing 21. A circular hole 221 arranged to retain the upper bearing section 25 is provided at the center of the cover section 22, The stator unit 23 is an armature which generates magnetic flux in response to a driving current. The stator unit 23 includes a stator core 26, an insulator 27, and a coil 28.

The stator core 26 is preferably defined by laminated steel plates in which a plurality of steel plates is laminated in an axial direction (a direction along the central axis 9, hereinafter the same), however, any other desirable stator type could be used instead. The stator core 26 preferably includes an annular core back 261 and a plurality of teeth 262 protruding from the core back 261 toward the inside in the radial direction (a direction perpendicular to the central axis 9, hereinafter the same). The core back 261 is fixed to the inner circumferential surface of a side wall of the housing 21. The plurality of teeth 262 is arranged approximately at regular intervals in a circumferential direction.

The insulator 27 is preferably a member made of, for example, resin, which is interposed between the tooth 262 and the coil 28. The insulator 27 is arranged to cover the surfaces other than the end surface on the inside in the radial direction of each tooth 262, that is, the upper surface, the lower surface, and the side surface of each tooth 262. The coil 28 is defined by a conducting wire wound around the insulator 27. A more detailed description of the structures of the insulator 27 and the coil 28 will be provided later.

The lower bearing section 24 and the upper bearing section 25 are mechanisms which rotatably support a shaft 31 on the rotating section 3 side. In each of the lower bearing section 24 and the upper bearing section 25 of this preferred embodiment, a ball bearing in which an outer race and an inner race are relatively rotated through spherical bodies is used. However, in place of the ball bearing, any other desirable type of bearing such as, for example, a plain bearing or a fluid bearing may also be used.

An outer race 241 of the lower bearing section 24 is fixed to the concave portion 211 of the housing 21. Further, an outer race 251 of the upper bearing section 25 is fixed to an edge of the circular hole 221 of the cover section 22. On the other hand, inner races 242 and 252 of the lower bearing section 24 and the upper bearing section 25 are fixed to the shaft 31. For this reason, the shaft 31 is supported so as to be able to rotate with respect to the housing 21 and the cover section 22.

The rotating section 3 in this preferred embodiment includes the shaft 31, the rotor core 32, and the plurality of magnets 33.

The shaft 31 is preferably a substantially columnar member extending up and down along the central axis 9. The shaft 31 rotates around the central axis 9 while being supported on the lower bearing section 24 and the upper bearing section 25 described above. Further, the shaft 31 preferably includes a head portion 311 protruding above the cover section 22. The head portion 311 is preferably connected to, for example, a steering gear of an automobile through a power transmission mechanism such as, for example, a gear.

The rotor core 32 and the plurality of magnets 33 are disposed radially inside the stator unit 23 and rotate along with the shaft 31. The rotor core 32 is a substantially cylindrical member fixed to the shaft 31. The plurality of magnets 33 is fixed to the outer circumferential surface of the rotor core 32 by, for example, an adhesive. The surface on the outside in the radial direction of each magnet 33 becomes a magnetic pole surface which faces the end surface on the inside in the radial direction of the tooth 262. The plurality of magnets 33 are arranged at regular intervals in a circumferential direction such that a magnetic pole surface having the north pole and a magnetic pole surface having the south pole are alternately arranged.

Alternatively, in place of the plurality of magnets 33, a single annular magnet in which the north pole and a south pole are alternately magnetized in a circumferential direction may also be used, if so desired.

In such a motor 1, if a driving current is imparted to the coil 28 of the stationary section 2, radial magnetic flux is generated in the plurality of teeth 262 of the stator core 26. Then, circumferential torque is generated by the action of the magnetic flux between the tooth 262 and the magnet 33. As a result, the rotating section 3 rotates around the central axis 9 with respect to the stationary section 2.

Figure 4:
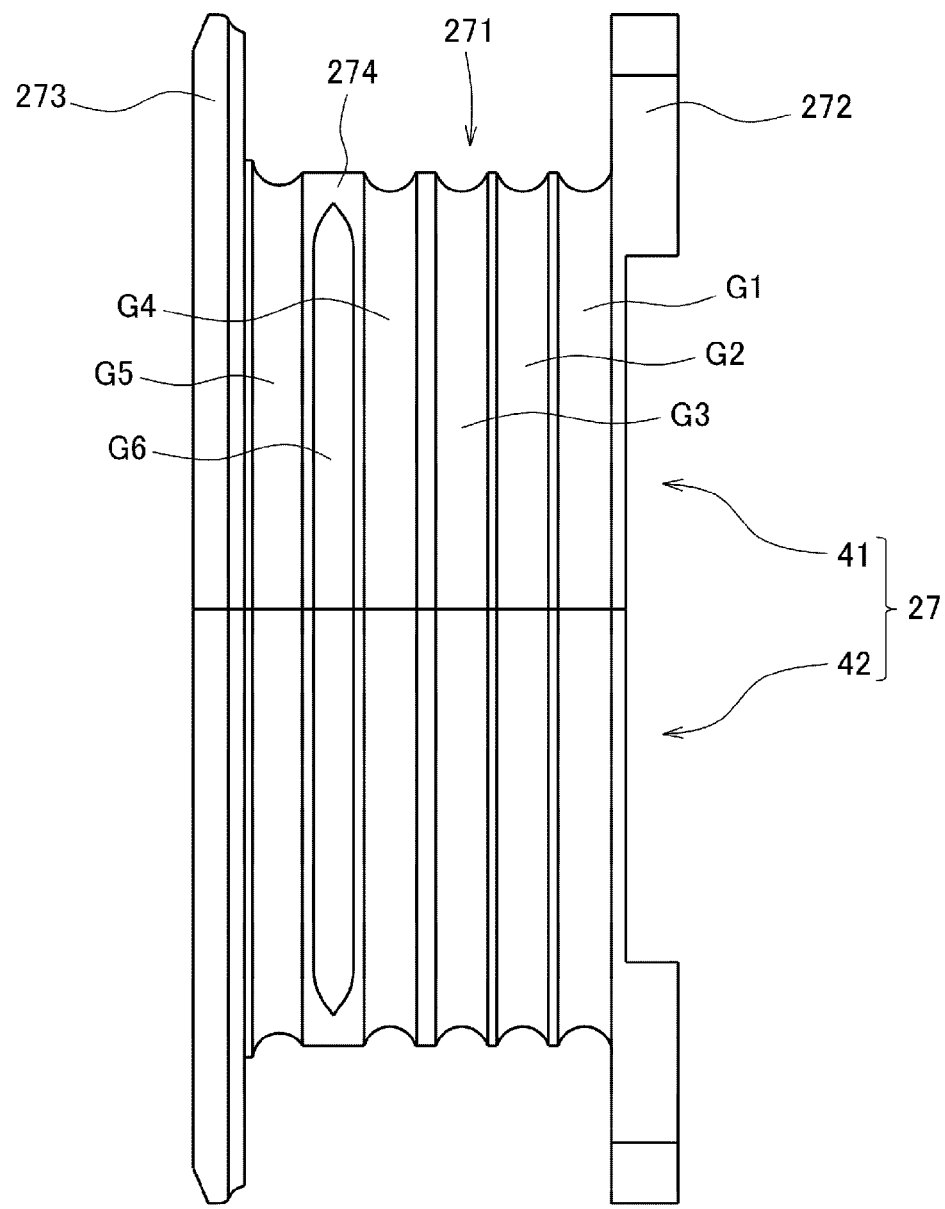
FIG. 4 is a side view of an insulator in accordance with a preferred embodiment of the present invention.
Figure 5:
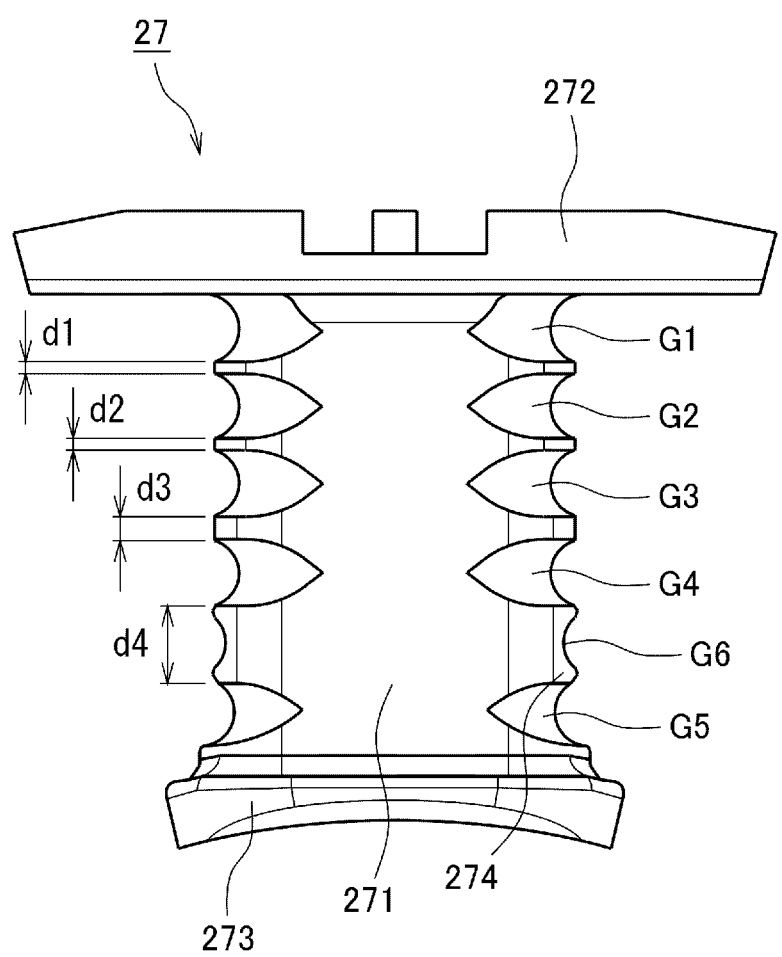
FIG. 5 is a top view of the insulator in accordance with a preferred embodiment of the present invention.

Subsequently, the more detailed structures of the insulator 27 and the coil 28 will be described. FIG. 4 is a side view of the insulator 27. FIG. 5 is a top view of the insulator 27.

As shown in FIG. 4, the insulator 27 in this preferred embodiment is preferably defined by a pair of resin members 41 and 42 disposed in an up and down arrangement. The resin member 41 on the upper side is preferably defined by a substantially U-shaped member which is opened toward the lower side. The resin member 42 on the lower side is preferably defined by a substantially U-shaped member which is opened toward the upper side. The pair of resin members 41 and 42 is preferably disposed so as to respectively cover the tooth 262 from above and below. In this way, the substantially tubular insulator 27 covering the tooth 262 is defined.

As shown in FIGS. 4 and 5, the insulator 27 preferably includes a tubular portion 271, an outer marginal portion 272, and an inner marginal portion 273. The tubular portion 271 covers the upper surface, the lower surface, and the side surface of the tooth 262. The outer marginal portion 272 is widened in a direction away from the tooth 262, that is, in a circumferential direction and an up-and-down direction in an end marginal portion on the outside in the radial direction of the tubular portion 271. The inner marginal portion 273 is widened in a direction away from the tooth 262, that is, in the circumferential direction and the up-and-down direction in an end marginal portion on the inside in the radial direction of the tubular portion 271.

In the outer circumferential surface of the tubular portion 271, a first groove G1 to a sixth groove G6 arranged to assist in winding a conducting wire are provided. The conducting wire constituting the coil 28 is wound along the first groove G1 to the sixth groove G6. As shown in FIG. 5, in this preferred embodiment, a distance d3 in the radial direction between the third groove G3 and the fourth groove G4 is preferably larger than a distance d1 in the radial direction between the first groove G1 and the second groove G2 and a distance d2 in the radial direction between the second groove G2 and the third groove G3. Further, a distance d4 in the radial direction between the fourth groove G4 and the fifth groove G5 is made larger than the distance d3 in the radial direction between the third groove G3 and the fourth groove G4.

Further, the insulator 27 preferably includes a wall portion 274 protruding in a direction away from the tooth 262 with the most recessed bottom portion of each of the fourth groove G4 and the fifth groove G5 as the standard, between the fourth groove G4 and the fifth groove G5. Then, the sixth groove G6 is provided in the surface of the wall portion 274.

Figure 6:
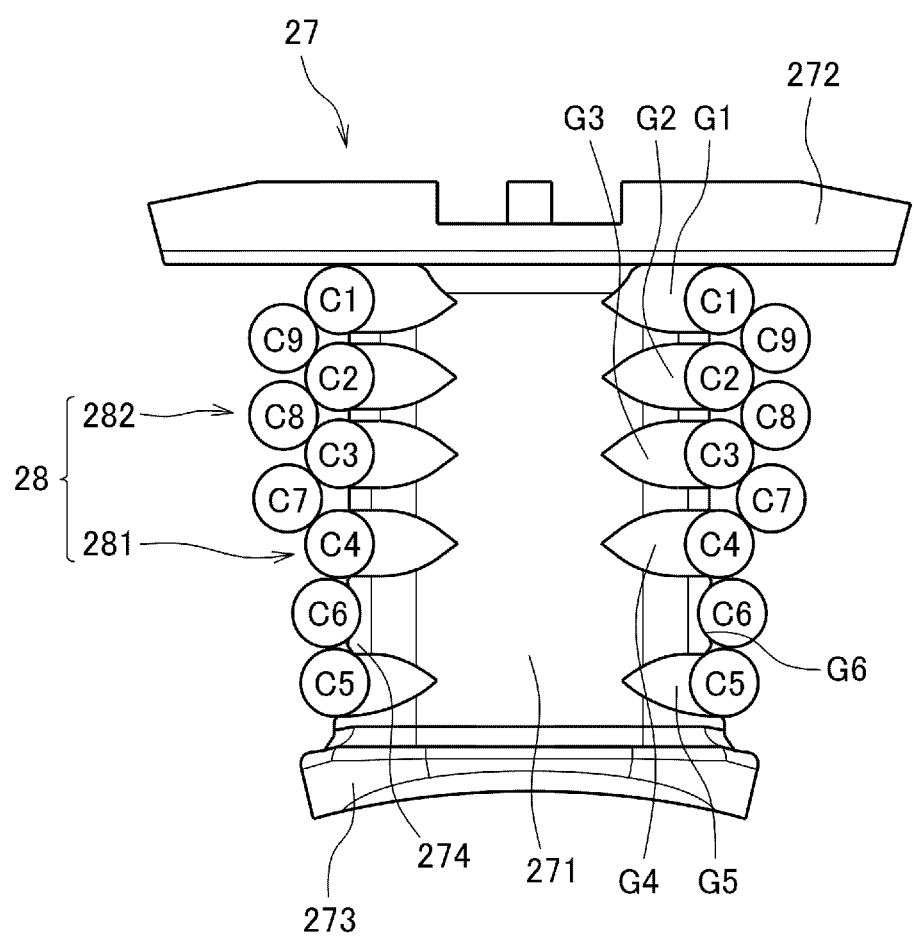
FIG. 6 is a diagram showing the upper surface of the insulator and the horizontal cross-section of a coil in accordance with a preferred embodiment of the present invention.

FIG. 6 is a diagram showing the upper surface of the insulator 27 and the horizontal cross-section of the coil 28 wound around the insulator 27. As in FIG. 6, the conducting wire defining the coil 28 is wound around the tubular portion 271 between the outer marginal portion 272 and the inner marginal portion 273.

To explain the specific winding order of the conducting wire, first, the conducting wire is sequentially wound around the insulator 27 toward the inside in the radial direction from the outside in the radial direction. As a result, a first turn C1 to a fifth turn C5 of the coil 28 are provided. The first turn C1 to the fifth turn C5 are respectively disposed along the first groove G1 to the fifth groove G5. In this way, position shifts of the first turn C1 to the fifth turn C5 are suppressed. Thereafter, the conducting wire is further wound toward the outside in the radial direction from the inside in the radial direction. As a result, a sixth turn C6 to a ninth turn C9 are provided. The sixth turn C6 is disposed along the sixth groove G6. In this way, a position shift of the sixth turn C6 is suppressed. In other words, the sixth groove G6 extending along the sixth turn C6 of the coil is provided in the surface of the wall portion 274.

That is, the coil 28 in this preferred embodiment includes a first layer 281 defined by the first turn C1 to the fifth turn C5 and a second layer 282 defined by the sixth turn C6 to the ninth turn C9. This preferred embodiment is equivalent to a mode of the above described preferred embodiments of the present invention in which m is set to be 5 and n is set to be 9.

Figure 7:
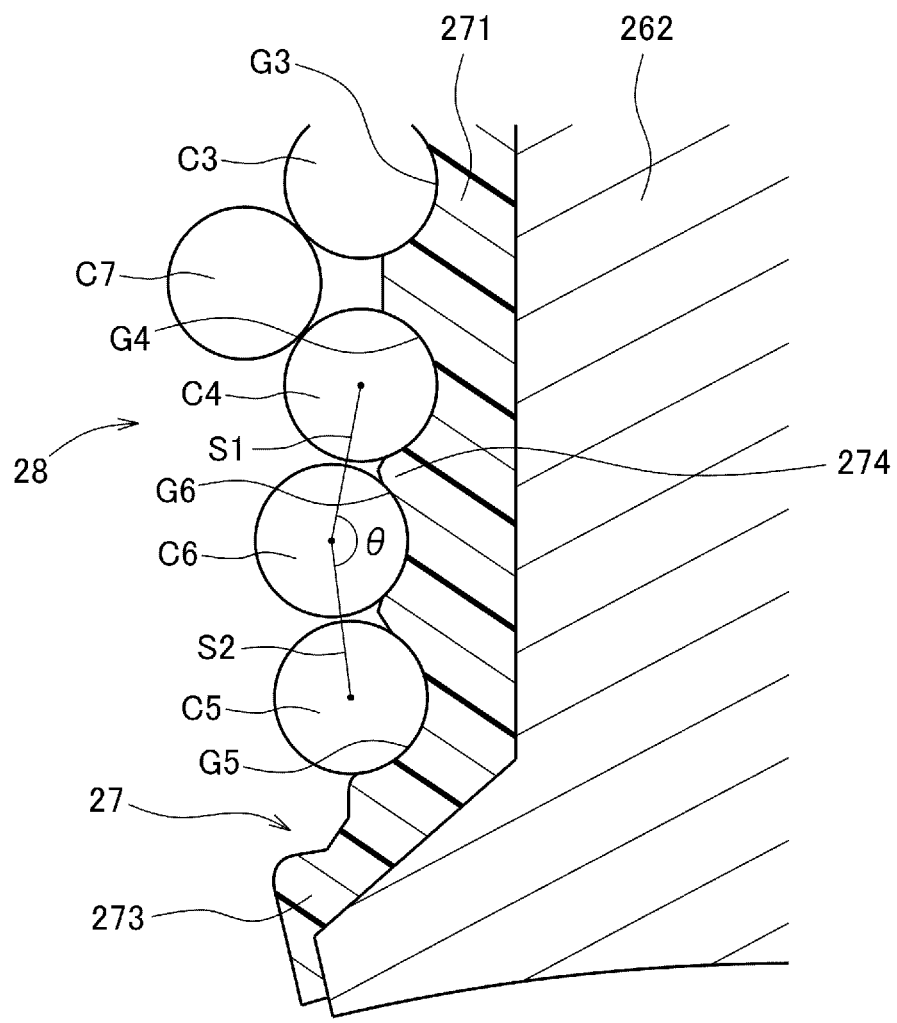
FIG. 7 is a horizontal cross-sectional view of the third turn to the seventh turn of the coil and a site in the vicinity thereof in accordance with a preferred embodiment of the present invention.

FIG. 7 is a horizontal cross-sectional view of the third turn C3 to the seventh turn C7 of the coil 28 and a site in the vicinity thereof. As shown in FIG. 7, the wall portion 274 of the insulator 27 is interposed between the fourth turn C4 and the fifth turn C5 of the coil 28. In this way, a distance that is wider than each distance in the first turn C1 to the fourth turn C4 is provided between the fourth turn C4 and the fifth turn C5. Further, the sixth turn C6 of the coil 28 is disposed between the fourth turn C4 and the fifth turn C5.

In this preferred embodiment, in a cross-section perpendicular to the central axis 9 and passing through the tooth 262, an angle θ between a line segment S1 connecting the respective centers of the sixth turn C6 and the fourth turn C4 and a line segment S2 connecting the respective centers of the sixth turn C6 and the fifth turn C5 is preferably set to be about 120° or more. In this way, about half or more of the sixth turn C6 overlaps the fourth turn C4 and the fifth turn C5 in the radial direction. Compared to a case where the angle θ is less than about 120°, the sixth turn C6 is disposed at a position close to the tooth 262. Therefore, bulging of the coil 28 in the vicinity of an inner peripheral portion of the tooth 262 is suppressed.

Further, in this preferred embodiment, the sixth turn C6 equivalent to an inner peripheral end portion of the second layer 282 is disposed further outside in the radial direction than the fifth turn C5 equivalent to an inner peripheral end portion of the first layer 281. Then, the seventh turn C7 is disposed further outside in the radial direction than the sixth turn C6. For this reason, compared to a case where the sixth turn is disposed further inside in the radial direction than the fifth turn, the second layer 282 is disposed radially outside as a whole. In this way, bulging of the coil 28 in the vicinity of the inner peripheral portion of the tooth 262 is further suppressed.

Figure 8:
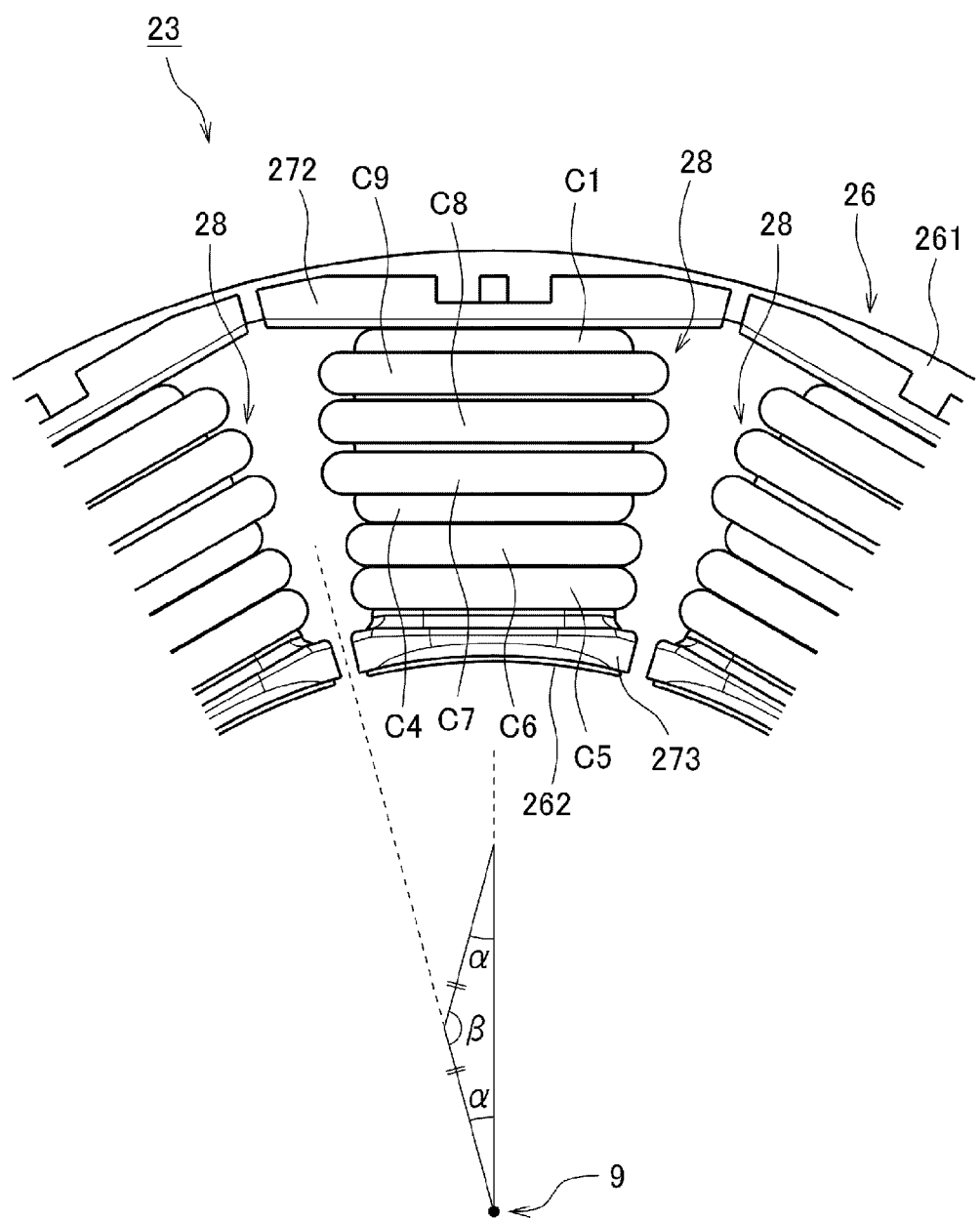
FIG. 8 is a partial top view of the stator unit in accordance with a preferred embodiment of the present invention.

FIG. 8 is a partial top view of the stator unit 23. As described above, if bulging of the coil 28 in the vicinity of the inner peripheral portion is suppressed, contact between the sixth turns C6 or contact between the seventh turns C7 of the adjacent coils 28 can be prevented. Therefore, a clearance can be secured between the adjacent coils 28 while increasing the number of turns of the coil 28.

Here, as shown in FIG. 8, half of the central angle per tooth is set to be α. Further, the vertical angle of an isosceles triangle with α as a base angle is set to be β. For example, in a case where the number of teeth 262 preferably is 6, α is about 30° and β is about 120°. In order to prevent contact between the sixth turns C6 of the adjacent coils 28, it is preferable that the above-described angle θ in FIG. 7 be larger than the angle β. Therefore, as in a case where the number of teeth 262 is 6 or more, in a case where the clearance between adjacent teeth in the vicinity of an inner peripheral portion becomes narrow, since β becomes equal to or more than about 120°, in order to prevent contact between the sixth turns C6, the above-described requirement θ≥120° is particularly of high significance.

In addition, the sixth turn C6 and the fourth turn C4 may also be spaced apart from each other, as in FIG. 7, and may also be in contact with each other. Further, the sixth turn C6 and the fifth turn C5 may also be spaced apart from each other, as in FIG. 7, and may also be in contact with each other.

In a case where the sixth turn C6 and the fourth turn C4 are in contact with each other, the fourth turn C4 is pushed radially outward by the tightening force of the sixth turn C6. Further, in a case where the sixth turn C6 and the fifth turn C5 are in contact with each other, the fifth turn C5 is pushed radially inward by the tightening force of the sixth turn C6. If the angle θ is set to be less than about 120°, the amount of position shift of each of the fourth turn C4 and the fifth turn C5 by the above-described tightening force becomes large.

In contrast to this, in the present preferred embodiment, the angle θ is preferably set to be more than or equal to about 120° and less than about 180°, for example. For this reason, even if the positions of the fourth turn C4 and the fifth turn C5 are shifted by the tightening force of the sixth turn C6, the amount of shift is small.

Further, in this preferred embodiment, the sixth turn C6 of the coil 28 is in contact with the sixth groove G6 of the insulator 27. In this way, the sixth turn C6 is stably disposed. The tightening force of the sixth turn C6 is taken by the surface of the sixth groove G6. Therefore, position shift of the fourth turn C4 or the fifth turn C5 by the tightening force of the sixth turn C6 is suppressed. As a result, the fourth turn C4 and the fifth turn C5 are also stably disposed.

The curvatures of the surfaces of the first groove G1 to the sixth groove G6 may also be equal to the curvature of the surface of the conducting wire and may also be different from the curvature of the surface of the conducting wire. However, as in FIG. 7, it is preferable that the surfaces of the first groove G1 to the sixth groove G6 and the surface of the conducting wire have the same curvature, in that the conducting wire can be positioned more precisely and stably.

In addition, in this preferred embodiment, the depth of the fifth groove G5 is preferably made slightly shallower than the depths of the first groove G1 to the fourth groove G4. In this way, the thickness of the insulator 27 in the vicinity of the inner peripheral portion is secured. Further, the fifth groove G5 is shallow, whereby the circumferential position of the fourth turn C4 and the circumferential position of the fifth turn C5 are slightly shifted. For this reason, the distance between the fourth turn C4 and the fifth turn C5 becomes slightly wider, compared to a case where the fourth turn C4 and the fifth turn C5 are disposed at the same circumferential position. As a result, the sixth turn C6 is more stably disposed between the fourth turn C4 and the fifth turn C5.

Further, the first groove G1 to the fifth groove G5 in this preferred embodiment extend not only to the side surface of the insulator 27, but also the upper surface and the lower surface of the insulator 27. In this way, the first turn C1 to the fifth turn C5 of the coil 28 are more stably disposed. On the other hand, since the sixth turn C6 of the coil 28 is disposed between the fourth turn C4 and the fifth turn C5, even if the sixth groove G6 is short, a position shift does not easily occur. From such a viewpoint, in this preferred embodiment, the length of the sixth groove G6 in a direction along the conducting wire is preferably shorter than the lengths of the first groove G1 to the fifth groove G5 in a direction along the conducting wire. Specifically, the sixth groove G6 is provided only in the side surface of the insulator 27. If the length of the sixth groove G6 is made short, it is preferable in that the shape of the insulator 27 is simplified accordingly.

Further, as shown in FIG. 6, in this preferred embodiment, the distance between the third turn C3 and the fourth turn C4 is preferably wider than each distance in the first turn C1 to the third turn C3. Then, the seventh turn C7 is disposed between the third turn C3 and the fourth turn C4. In this way, the seventh turn C7 approaches the tooth 262, so that bulging of the coil 28 is further suppressed.

The exemplary preferred embodiments of the invention have been described above. However, the present invention is not limited to the above-described preferred embodiments.

Figure 9:
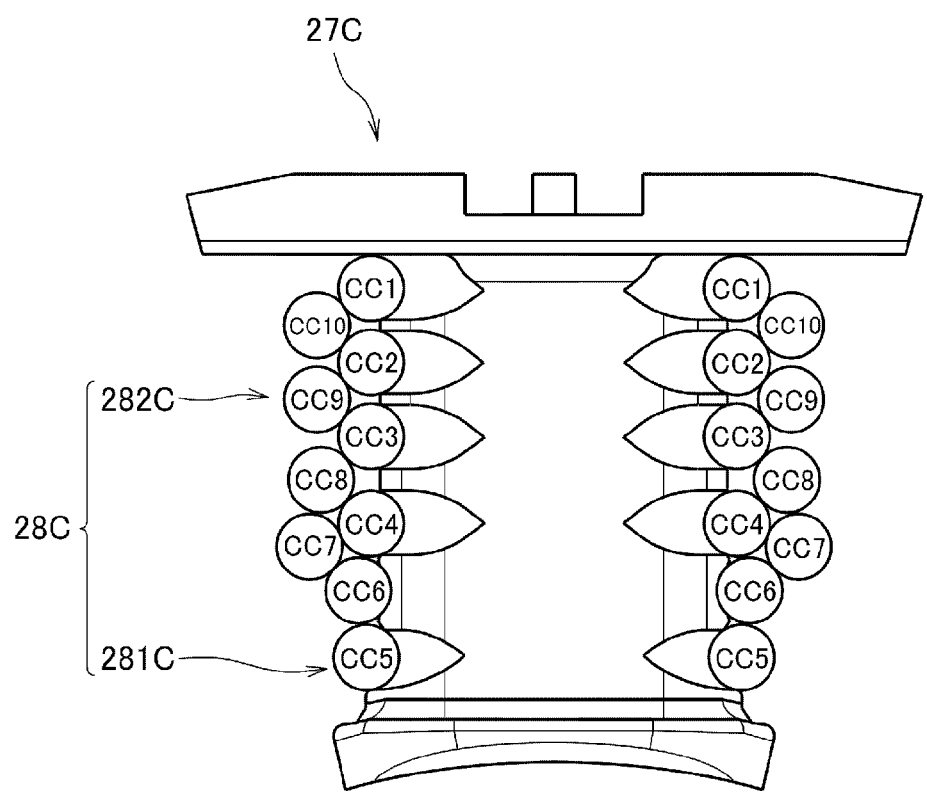
FIG. 9 is a diagram showing the upper surface of the insulator and the horizontal cross-section of the coil in accordance with a preferred embodiment of the present invention.

FIG. 9 is a diagram showing the upper surface of an insulator 27C related to a modified example of a preferred embodiment of the present invention and the horizontal cross-section of a coil 28C corresponding thereto. In the example shown in FIG. 9, the coil 28C has a first layer 281C defined by a first turn CC1 to a fifth turn CC5 and a second layer 282C defined by a sixth turn CC6 to a tenth turn CC10. As in this example, the seventh turn CC7 of the coil 28C may also be disposed between the fourth turn CC4 and the sixth turn CC6. However, as in the third preferred embodiment described above, the seventh turn C7 is disposed between the third turn C3 and the fourth turn C4, whereby the seventh turn C7 can be disposed more outside in the radial direction. Therefore, bulging of the coil 28 in the vicinity of the inner peripheral portion can be further suppressed.

Figure 10:
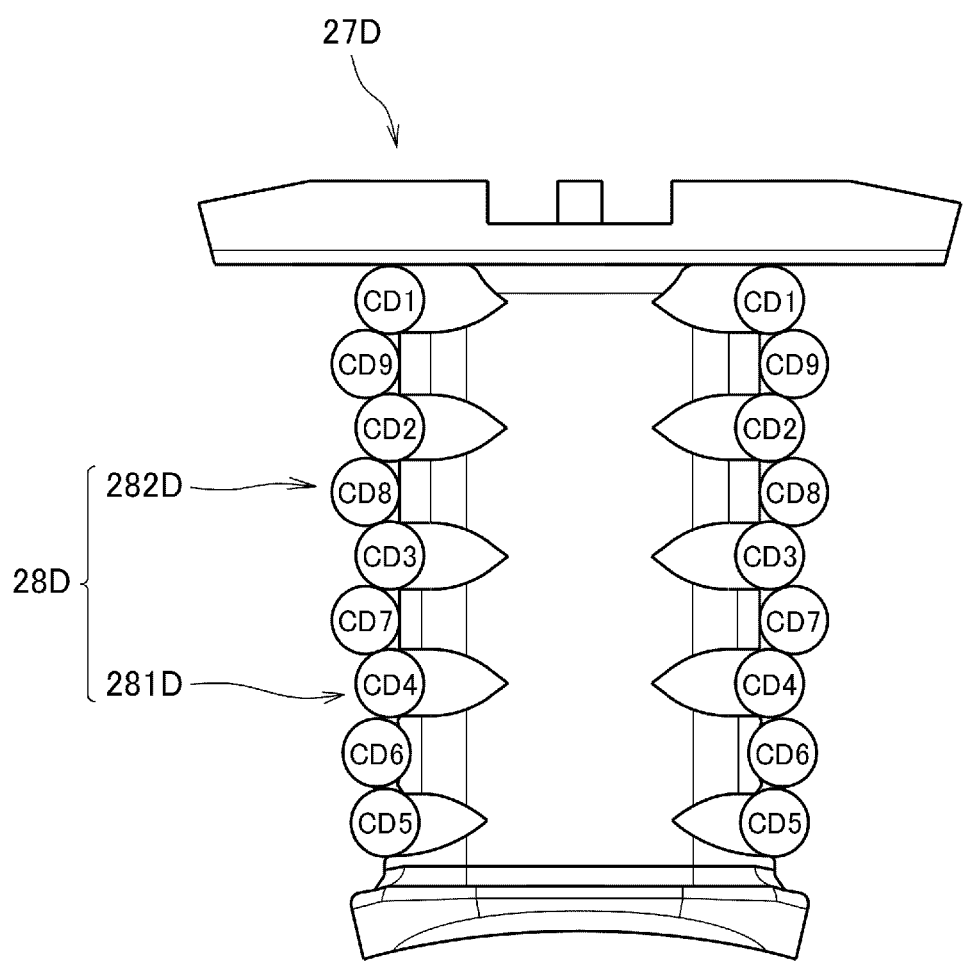
FIG. 10 is a diagram showing the upper surface of the insulator and the horizontal cross-section of the coil in accordance with a preferred embodiment of the present invention.

FIG. 10 is a diagram showing the upper surface of an insulator 27D related to another modified example of a preferred embodiment of the present invention and the horizontal cross-section of a coil 28D corresponding thereto. In the example shown in FIG. 10, the coil 28D includes a first layer 281D defined by a first turn CD1 to a fifth turn CD5 and a second layer 282D defined by a sixth turn CD6 to a ninth turn CD9. Then, all the sixth turn CD6 to the ninth turn CD9 of the coil 28D are in contact with the insulator 27D. In this manner, if each of the m+1-th turn to the n-th turn of the coil is in contact with the insulator, bulging of the coil by the m+1-th turn to the n-th turn can be further suppressed.

Figure 11:
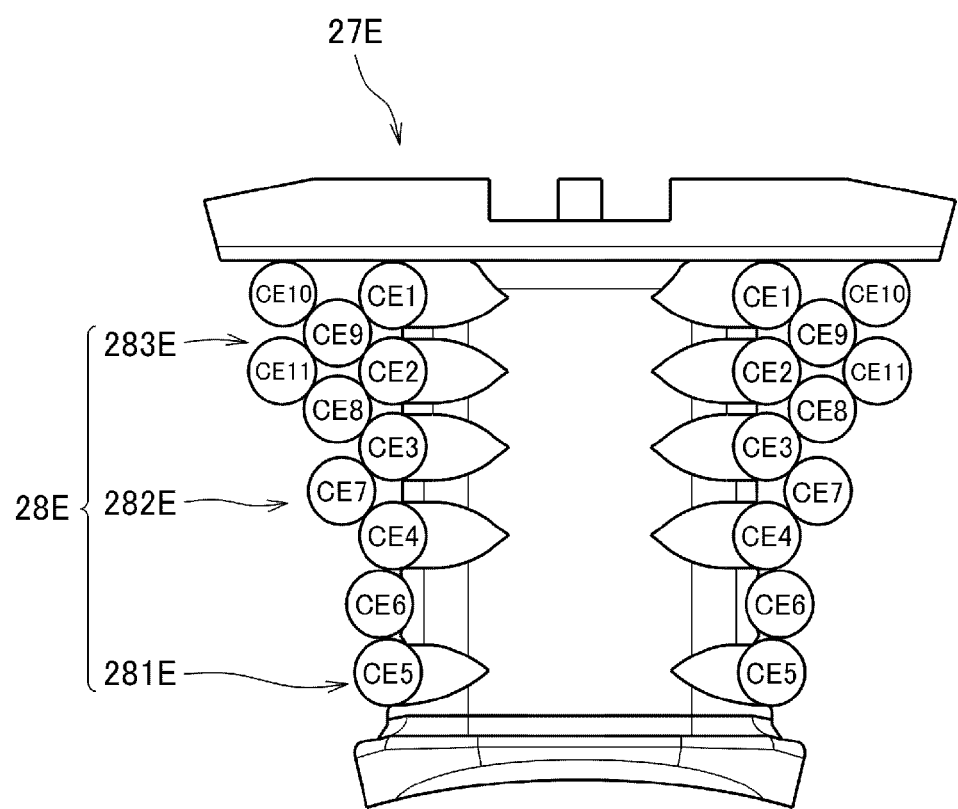
FIG. 11 is a diagram showing the upper surface of the insulator and the horizontal cross-section of the coil in accordance with a preferred embodiment of the present invention.

FIG. 11 is a diagram showing the upper surface of an insulator 27E related to still another modified example of a preferred embodiment of the present invention and the horizontal cross-section of a coil 28E corresponding thereto. In the example shown in FIG. 11, the coil 28E has a first layer 281E defined by a first turn CE1 to a fifth turn CE5, a second layer 282E defined by a sixth turn CE6 to a ninth turn CE9, and a third layer 283E defined by a tenth turn CE10 and an eleventh turn CE11. In this manner, the coil may also include three or more layers. In this way, the number of turns of coil 28E in the vicinity of an outer peripheral portion can be further increased. In addition, in order to suppress bulging of the coil 28E in the vicinity of the inner peripheral portion, it is preferable if the number of turns in the third layer 283E is set smaller than the number of turns in the first layer 281E or the second layer 282E.

Figure 12:
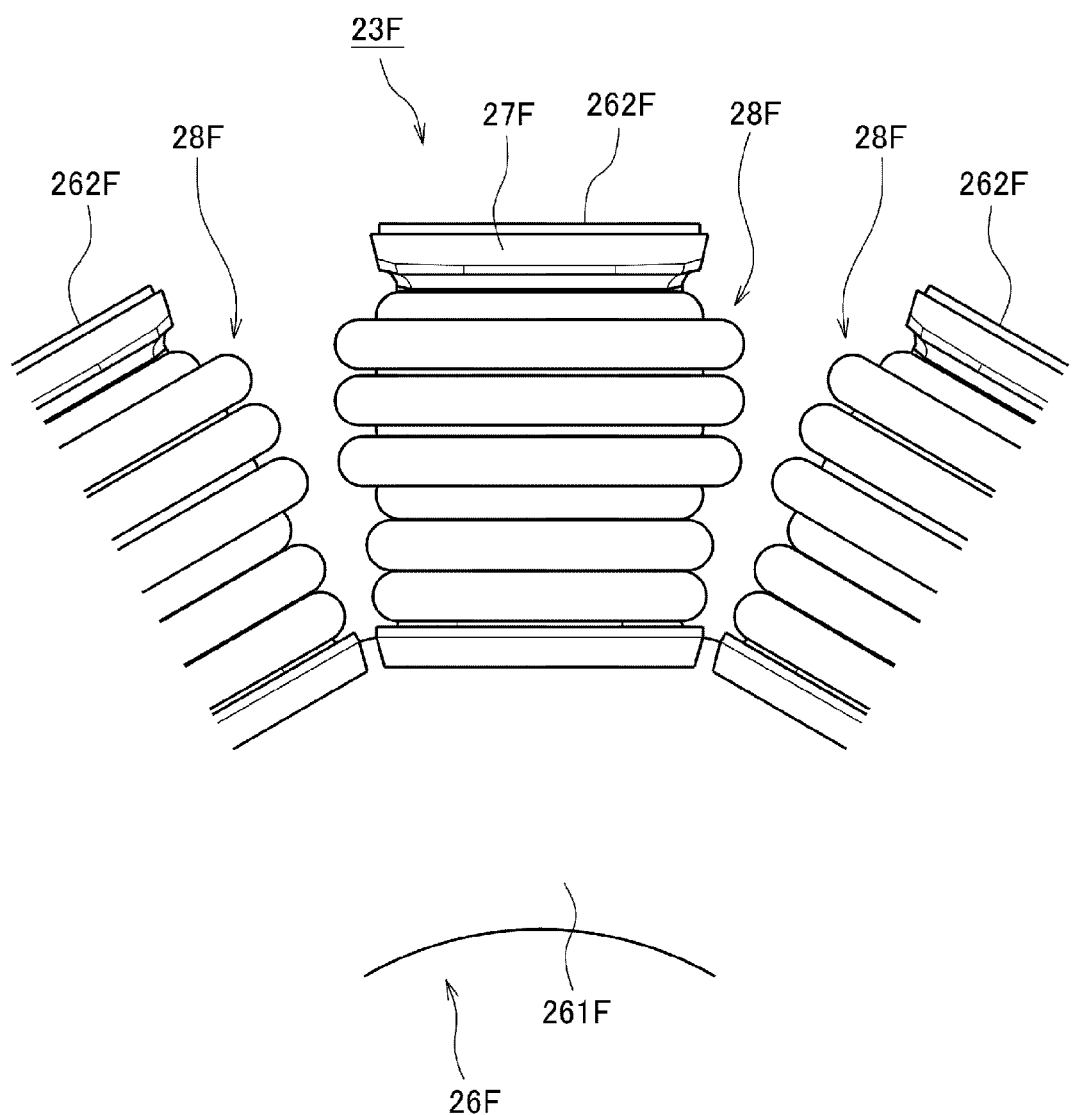
FIG. 12 is a partial top view of the stator unit in accordance with a preferred embodiment of the present invention.

FIG. 12 is a partial top view of a stator unit 23F related to still yet another modified example. In the example shown in FIG. 12, a plurality of teeth 262F extends toward the outside in the radial direction from an annular core back 261F. Then, an insulator 27F is mounted on each tooth 262F and a coil 28F is wound around the insulator 27F. In this example, a plurality of magnets is disposed radially outside the stator unit 23F.

Also in motors of a so-called outer rotor type, similarly to each preferred embodiment described above, if a conducting wire is wound around each insulator 27F, thereby defining the coil 28F, bulging in the radial direction of the coil 28F in the vicinity of the inner peripheral portion of the tooth 262F can be suppressed.

Figure 13:
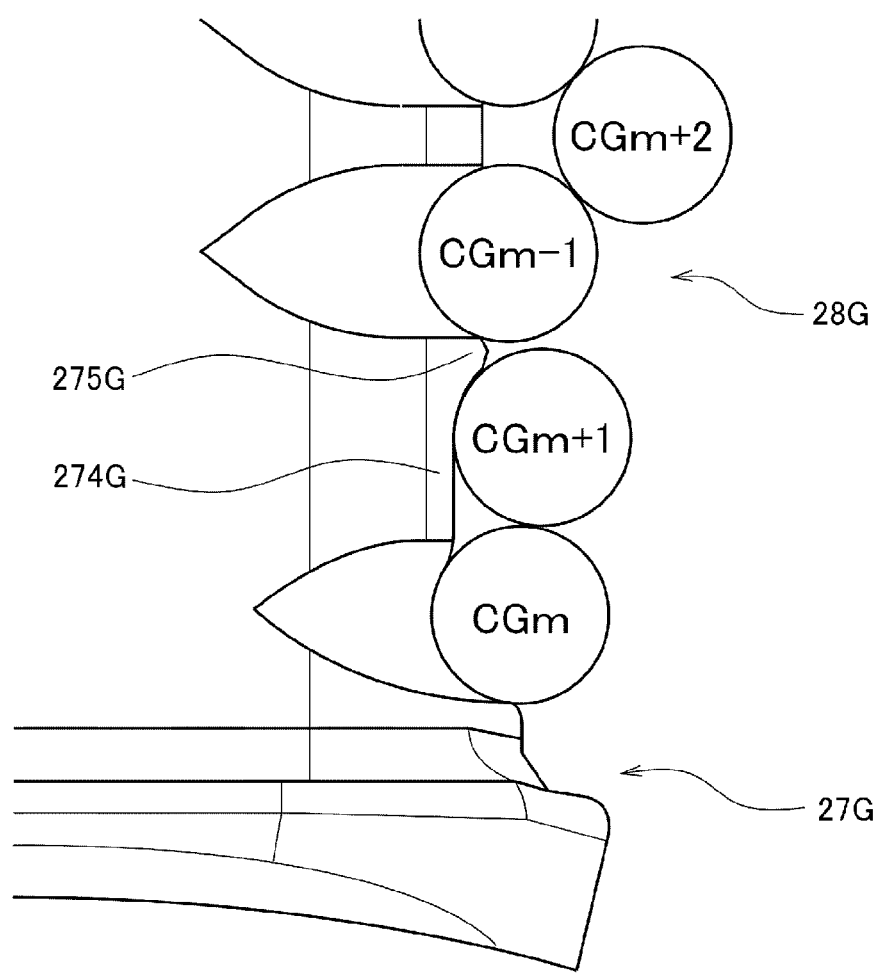
FIG. 13 is a diagram showing the partial upper surface of the insulator and the partial horizontal cross-section of the coil in accordance with a preferred embodiment of the present invention.

FIG. 13 is a diagram showing the partial upper surface of an insulator 27G related to a still yet further modified example of a preferred embodiment of the present invention and the partial horizontal cross-section of a coil 28G corresponding thereto. The insulator 27G in FIG. 13 includes a boundary convex portion 275G. The boundary convex portion 275G protrudes in a direction away from a tooth in an end portion on the outside in the radial direction of a wall portion 274G. Further, the boundary convex portion 275G is located at a boundary portion between an m−1-th turn CGm−1 and an m+1-th turn CGm+1 of the coil 28G. Further, an apex portion of the boundary convex portion 275G is farther away from the tooth than the surface of the insulator 27G in a boundary portion between an m-th turn CGm and the m+1-th turn CGm+1. A radially inward position shift of the m−1-th turn CGm−1 or a radially outward position shift of the m+1-th turn CGm+1 is suppressed by the boundary convex portion 275G.

Figure 14:
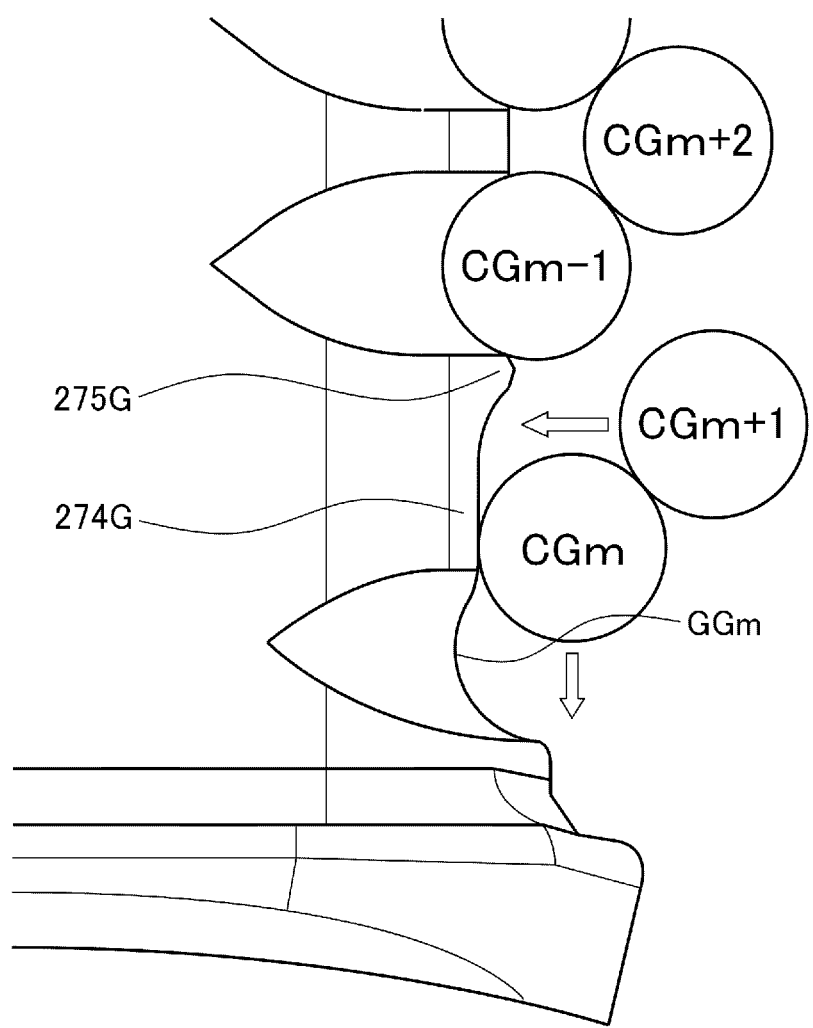
FIG. 14 is a diagram showing a situation when a conducting wire is wound around the insulator in accordance with a preferred embodiment of the present invention.

FIG. 14 is a diagram showing a situation when a conducting wire is wound around the insulator 27G in FIG. 13. The conducting wire is preferably wound around the insulator 27G in order of the m−1-th turn CGm−1, the m-th turn CGm, and the m+1-th turn CGm+1. This insulator 27G preferably does not have a boundary convex portion between the m-th turn CGm and the m+1-th turn CGm+1. For this reason, there is a case where the winding position of the m-th turn CGm is shifted further outward in the radial direction than an m-th groove GGm. However, as shown by a white arrow in FIG. 14, when winding the m+1-th turn CGm+1, the m+1-th turn CGm+1 pushes the m-th turn CGm back to the inside in the radial direction. As a result, the position of the m-th turn CGm is corrected.

The first groove to the m-th groove may also extend to the upper surface or the lower surface of the insulator 27, as in the third preferred embodiment described above, and may also be provided only in the side surface of the insulator 27. Further, the m+1-th groove may also be provided only in the side surface of the insulator 27, as in the third preferred embodiment described above, and may also extend to the upper surface or the lower surface of the insulator 27. Further, the first groove to the m+1-th groove of the insulator may also continuously extend in the axial direction, as in FIG. 4, and may also be intermittently formed in the axial direction.

Figure 15:
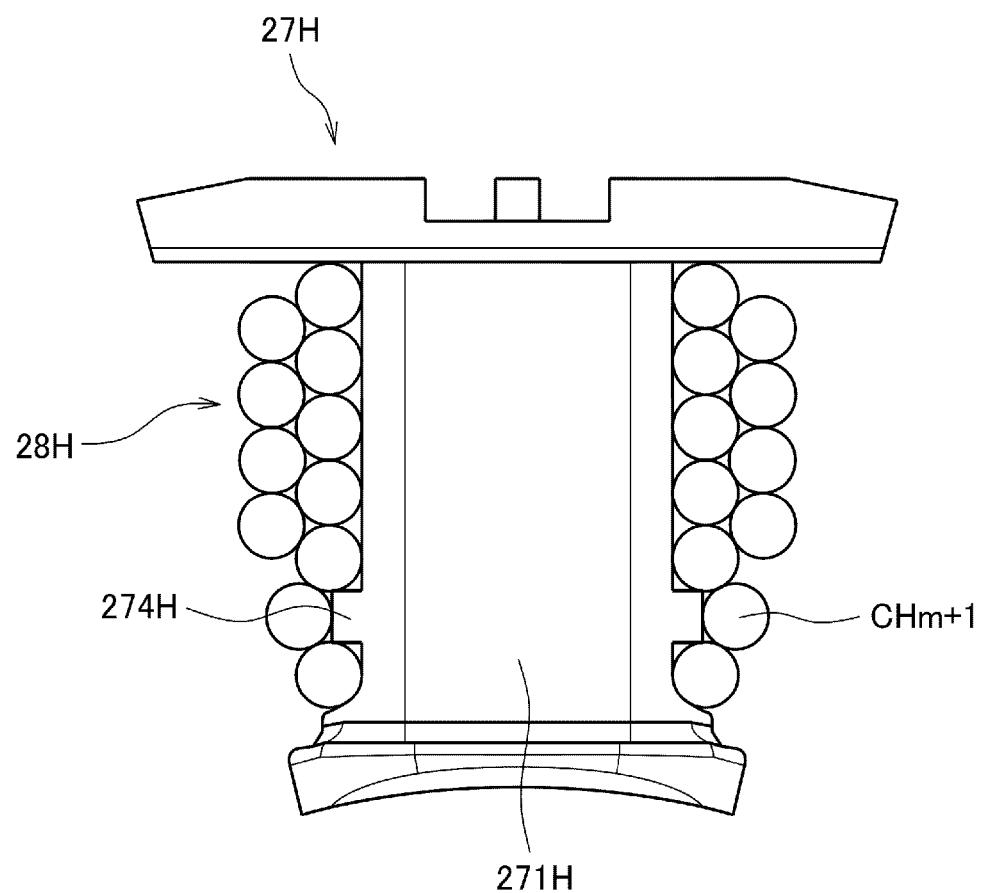
FIG. 15 is a diagram showing the upper surface of the insulator and the horizontal cross-section of the coil in accordance with a preferred embodiment of the present invention.
Figure 16:
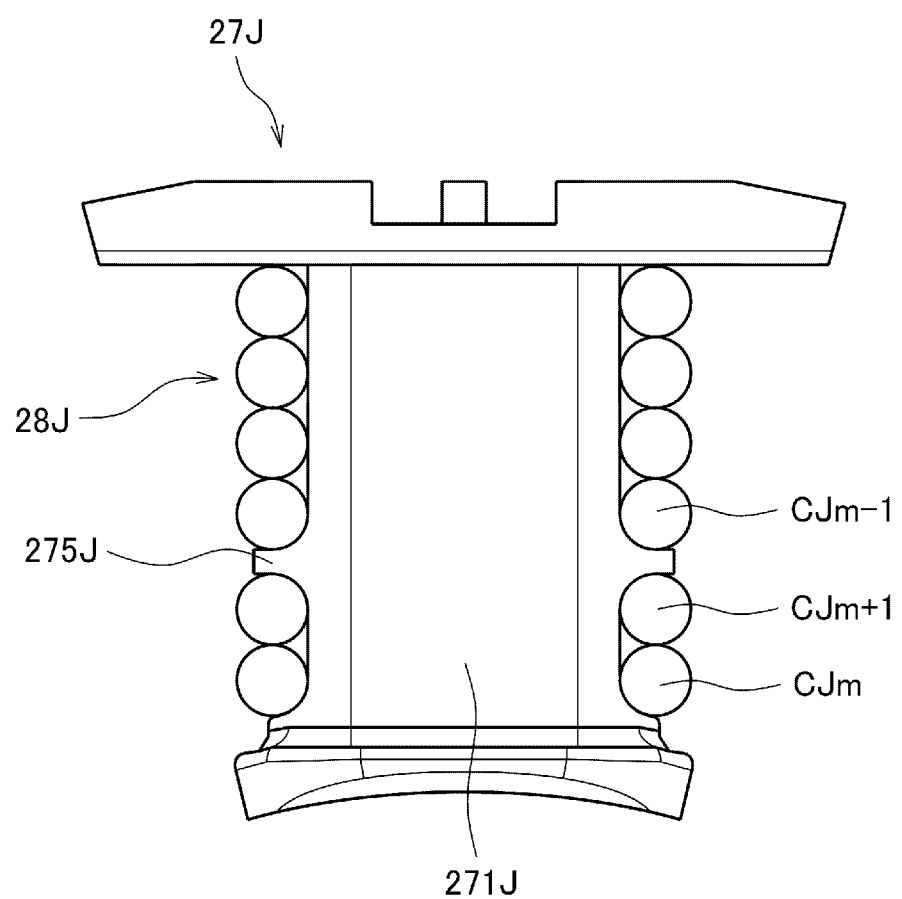
FIG. 16 is a diagram showing the upper surface of the insulator and the horizontal cross-section of the coil in accordance with a preferred embodiment of the present invention.
Figure 17:
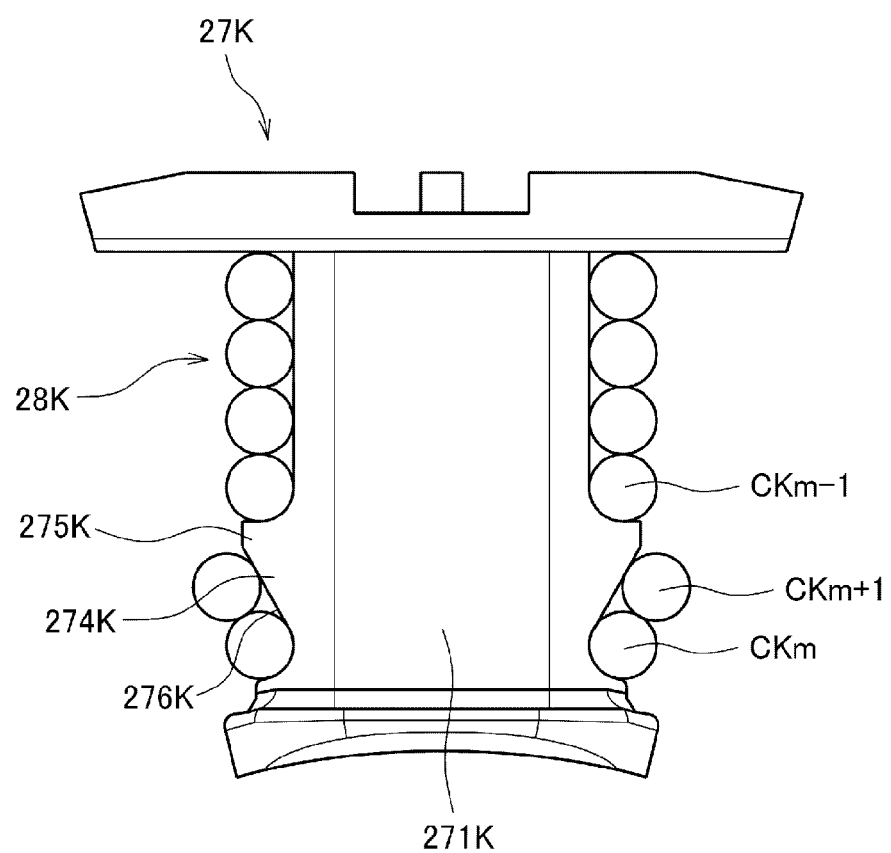
FIG. 17 is a diagram showing the upper surface of the insulator and the horizontal cross-section of the coil in accordance with a preferred embodiment of the present invention.

FIGS. 15 to 17 are diagrams showing the upper surfaces of insulators related to other modified examples of preferred embodiments of the present invention and the horizontal cross-sections of coils corresponding thereto. In the examples shown in FIGS. 15 to 17, the first groove to the m+1-th groove are not provided in the tubular portion of the insulator. If the first groove to the m+1-th groove are omitted, it is easy to cope with conducting wires having different wire diameters. Therefore, even if the diameter of the conducting wire defining the coil is changed, an insulator having the same shape can be used.

In addition, in the example shown in FIG. 15, a wall portion 274H is provided on the surface of a tubular portion 271H of an insulator 27H. An m+1-th turn CHm+1 of a coil 28H is in contact with the wall portion 274H.

Further, in the example shown in FIG. 16, preferably no grooves or wall portions are present in the surface of a tubular portion 271J of an insulator 27J. Instead, only a boundary convex portion 275J is preferably provided. The boundary convex portion 275J is interposed between an m−1-th turn CJm−1 and an m+1-th turn CJm+1. The m+1-th turn CJm+1 of a coil 28J is wound further outside in the radial direction than an m-th turn CJm and is in contact with the boundary convex portion 275J.

Further, in the example shown in FIG. 17, a wall portion 274K and a boundary convex portion 275K are preferably provided on the surface of a tubular portion 271K of an insulator 27K. The boundary convex portion 275K is interposed between an m−1-th turn CKm−1 and an m+1-th turn CKm+1 of a coil 28K. Further, the insulator 27K in FIG. 17 preferably includes an inclined surface 276K which comes closer to the tooth as it goes radially inward from an apex portion of the boundary convex portion 275K. Then, an m-th turn CKm and the m+1-th turn CKm+1 of the coil 28K are disposed along the inclined surface 276K.

The insulator may also include a pair of resin members, as in the third preferred embodiment described above, and may also include a single resin member provided for each tooth. Further, each insulator may also include three or more resin members. Further, the insulator may also be provided by an arcuate or annular resin member which covers a plurality of teeth, if so desired.

Further, the shape of the details of each member may also be different from the shape shown in each drawing of this application.

Further, the respective elements appeared in the preferred embodiments or the modified examples described above may also be appropriately combined in a range in which inconsistency does not occur.

Various preferred embodiments of the present invention can be used in a stator unit and a motor or a generator, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A stator unit comprising:
a plurality of teeth extending in a radial direction with respect to a central axis;
an insulator that covers each of the plurality of teeth; and
a coil that is defined by a conducting wire wound around the insulator; wherein
when m is set to be an integer equal to 2 or more and n is set to be an integer larger than m+1, the coil includes:
a first layer defined by a first turn to an m-th turn; and
a second layer defined by an m+1-th turn to an n-th turn;
a first turn to the m-th turn are sequentially wound around the insulator toward inside in the radial direction from outside in the radial direction;
the m+1-th turn to the n-th turn are sequentially wound toward the outside in the radial direction from the inside in the radial direction;
a distance between an m−1-th turn and the m-th turn is wider than each distance in the first turn to the m−1-th turn;
the m+1-th turn is disposed between the m−1-th turn and the m-th turn;
in a cross-section perpendicular or substantially perpendicular to the central axis and passing through the tooth, an angle between a line segment connecting respective centers of the m+1-th turn and the m−1-th turn and a line segment connecting respective centers of the m+1-th turn and the m-th turn is more than or equal to about 120° and less than about 180°; and
a space is provided between the m+1-th turn and the insulator.

2. The stator unit according to claim 1, wherein the m+1 turn is in contact with the insulator.

3. The stator unit according to claim 2, wherein the insulator includes a wall portion protruding in a direction away from the tooth between the m−1-th turn and the m-th turn; and the m+1-th turn is in contact with the wall portion.

4. The stator unit according to claim 3, wherein an m+1-th groove extending along the m+1-th turn of the coil is provided in the surface of the wall portion.

5. The stator unit according to claim 4, wherein a length of the m+1-th groove in a direction along the conducting wire is shorter than lengths from the first groove to the m-th groove in a direction along the conducting wire.

6. The stator unit according to claim 4, wherein the m+1-th groove is defined by a curved surface having curvature equal or approximately equal to that of an outer circumferential surface of the conducting wire.

7. The stator unit according to claim 1, wherein the number of teeth is 6 or more.

8. The stator unit according to claim 1, wherein the insulator includes a boundary convex portion protruding toward a direction away from the tooth, at a boundary portion between the m−1-th turn and the m+1-th turn; and
an apex portion of the boundary convex portion is farther away from the tooth than a surface of the insulator in a boundary portion between the m-th turn and the m+1-th turn.

9. The stator unit according to claim 1, wherein the insulator includes a first groove to an m-th groove which respectively extend along the first turn to the m-th turn of the coil.

10. The stator unit according to claim 9, wherein each of the first groove to the m-th groove is defined by a curved surface having curvature equal or approximately equal to that of an outer circumferential surface of the conducting wire.

11. The stator unit according to claim 9, wherein the first groove to the m-th groove are arranged to extend over a side surface of the insulator and at least a portion of an upper surface or a lower surface of the insulator.

12. The stator unit according to claim 9, wherein the m-th groove is shallower than the first groove to the m−1-th groove.

13. The stator unit according to claim 1, wherein a distance between the m−2-th turn and the m−1-th turn is wider than each distance in the first turn to the m−2-th turn; and
a portion of the conducting wire defining the second layer is arranged between the m−2-th turn and the m−1-th turn.

14. The stator unit according to claim 1, wherein each of the m+1-th turn to the n-th turn are in contact with the insulator.

15. A motor comprising:
the stator unit according to claim 1; and
a magnet including a magnetic pole surface which faces end surfaces of a plurality of teeth; wherein
the stator unit and the magnet are supported so as to be able to relatively rotate about the central axis.

* * * * *